United States Patent [19]

Young

[11] Patent Number: 5,382,962

[45] Date of Patent: Jan. 17, 1995

[54] DUAL PURPOSE HANDLE AND CONTROLLER FOR HANDHELD COMPUTER

[76] Inventor: Edgar D. Young, Channel Island Harbour #191; 3600 S. Harbour Blvd., Oxnard, Calif. 93035

[21] Appl. No.: 2,666

[22] Filed: Jan. 11, 1993

[51] Int. Cl.⁶ ............................................. G09G 3/02
[52] U.S. Cl. ..................................... 345/167; 345/157
[58] Field of Search .................. 340/706, 709, 710; D14/114, 115, 116, 117; 364/708, 709.01, 709.08, 709.11; 341/20, 22

[56] References Cited

U.S. PATENT DOCUMENTS

| | | | |
|---|---|---|---|
| 4,007,443 | 2/1977 | Bromberg | 340/792 |
| 4,458,238 | 7/1984 | Learn | 341/20 |
| 4,739,128 | 4/1988 | Grisham | 340/709 |
| 5,021,771 | 6/1991 | Lachman | 340/709 |
| 5,049,863 | 9/1991 | Oka | 340/709 |
| 5,187,468 | 2/1993 | Garthwaite | 340/709 |
| 5,208,736 | 5/1993 | Crooks | 340/709 |

OTHER PUBLICATIONS

IBM Technical Disclosure Bull. 27(10B):6299-6305 Mar. 1985 "Morse/Keyboard Concept Incorporating Unique Devices . . . ".

PC Magazine, Oct. 15, 1991, p. 128 "Portable Pointing Devices".

*Primary Examiner*—Alvin E. Oberley
*Assistant Examiner*—Aaron Banerjee

[57] ABSTRACT

A handle/controlle 3 consisting of a gripping handle of suitable shape as to conform to the hand and attached to a hand held computer 1 or a base unit 2 of the same and containing on either side a ball in socket or "cursor ball" 5L and a pressure switch or "action switch" 6L; a two position left/right switch 8. and suitable circuitry such that:

1. Each of the left/right switch position determines activation of a cursor ball on one side together with the action switch on the opposite side.
2. Rotation of the cursor ball in a particular direction when activated results in sending a suitably compatible vectored signal to the computer as to indicate the amount and direction of the rotation.
3. The position of the corresponding action switch is recorded in the computer.

2 Claims, 3 Drawing Sheets

DUAL PURPOSE HANDLE AND CONTROLLER FOR HANDHELD COMPUTER

BACKGROUND-FIELD OF INVENTION

This invention provides enhanced operational capability for a handheld computer.

BACKGROUND-DISCUSSION OF PRIOR ART

Currently small general purpose computers are referred to as "palmtops". These devices are designed to be held in the palm of the hand and operated by a keyboard. Similarly small special purpose "handheld" computers are designed to be operated from a keyboard although some can be fitted with handles for easier operation.

However more powerful handheld computers will be forthcoming which can run any software now existing for desktop computers. With the advent of handheld computers capable of running advanced existing software it would be regretable if one could not could not take advantage of software features involving the the use of a mouse. This invention provides mouse type capabilities by embedding ball type cursor controll and selection signalling in a handle arrangement, which also provides a secure grip and good display orientation.

Searching the Official Gazettes for the past four years has revealed nothing relating to input control combined with gripping handle. This is not surprising as general purpose handheld or palmtop computers are very recent on the PC scene. The idea is one whose time has barely arrived. The idea of using ball type controllers to provide handy cursor function is exemplified in U.S. Pat. No. 5,021,771 (1991). However the application there is to easy cursor control while typing, the controller type function being embedded in a keyboard. A similar application appears in U.S. Pat. No. 5,049,863 (1991), wherein the control function is removably attached to a keyboard. By contrast this invention offers something entirely unique and unsuspected as to application as discussed under Summary, Ramifications and Scope.

Objects and advantages.
1. This invention restores the mouse capability for a handheld, providing two hand operation while one hand holds the computer!
2. If made removable it also provides a mouse fnctionality allowing the full use of the handheld computer as a desktop computer.

DESCRIPTION OF THE INVENTION

Figure 1:
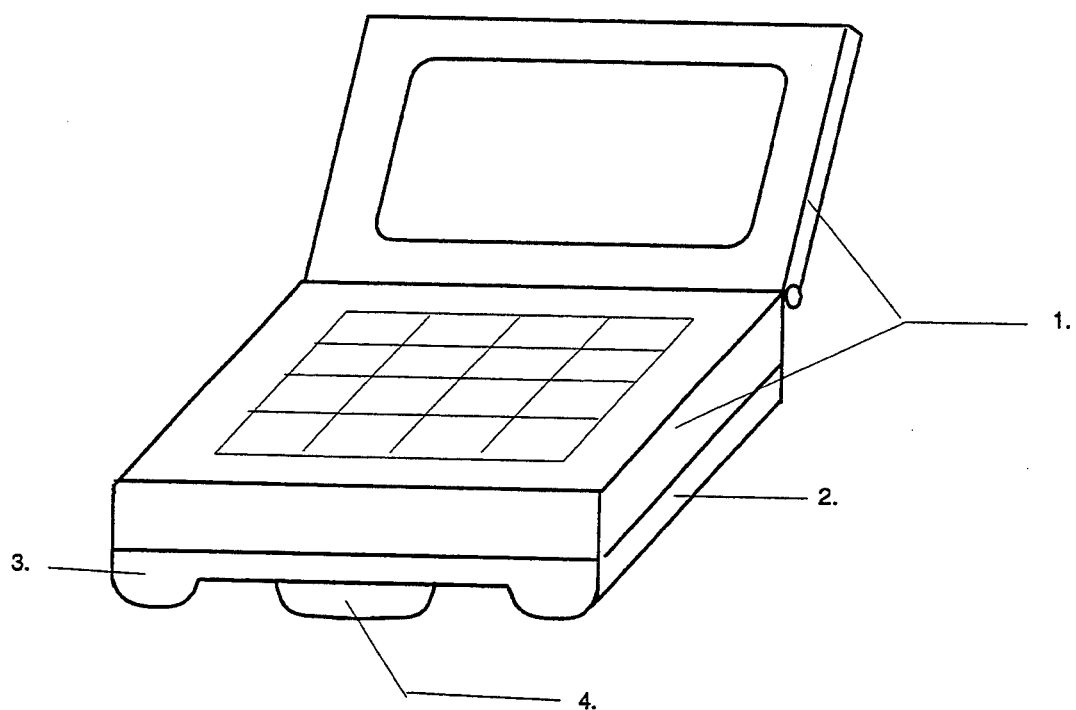
FIG. 1. shows the relation ship of the invention to the handheld computer it supports.
Figure 2:
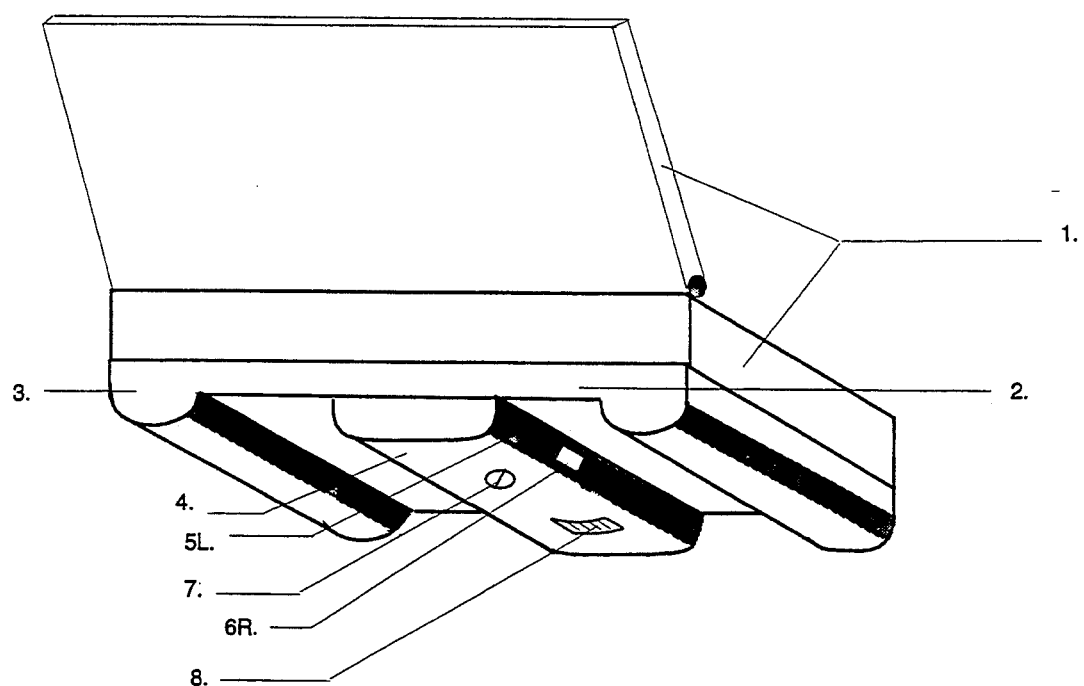
FIG. 2. is from a different perspective showing types of external parts used in the the invention.
Figure 3:
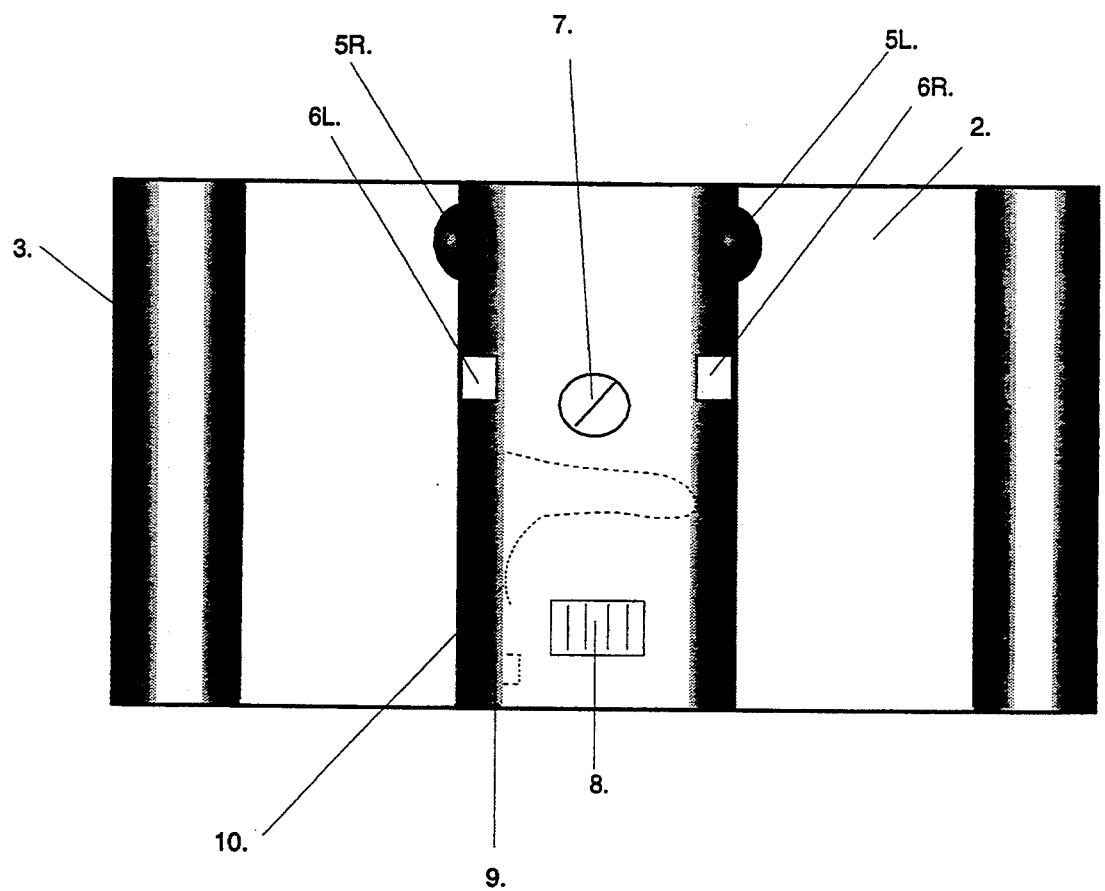
FIG. 3. shows all essential external as well as internal physical parts from the bottom of the assembly.

The central part of the invention consists of a "handle/controller" a feasible embodiment of which is shown 4. FIGS. 1, 2, 3. Physically the handle/controller appears as a bulk handle conforming suitably to the shape of the hand, embedded into which are two controller arrangements (one for either hand), each consisting of an "action switch" and a "cursor ball", one on each side of the handle forming an arrangement for the particular hand. In FIG. 3. the left hand arrangement is labelled 5L; 6L and the right hand arrangement is labelled 5R; 6R.

For either hand the cursor ball is located conveniently near the thumb, when the handle is held, and the opposing action switch is located conveniently near to a chosen finger (e.g. the index or middle finger).

A second switch type, the "left/right switch" 8. (FIGS. 2,3) is wired such that it left or right position activates a corresponding controller arrangement.

Each cursor ball is electrically equipped and wired such that the ball, when activated and rolled in a particular direction within its socket, sends a suitably standardized vectored signal via a suitable connector, to the computer indicative of the amount and direction of rotation. Such divices are currently in use with various controller arrangements.

Likewise the corresponding action switch sends a suitably compatible signal to the computer indicating its position.

In the embodiment shown the handle/controller is detachable by use of a suitable attachment screw 7. (FIGS. 2, 3). When detached a connector chord stored inside 10. (FIG. 3) may be used to connect the Handle/controller to the handheld computer 1. (FIGS. 1, 2) attaching to its base unit 2. (FIGS. 1, 2, 3), via a suitable connector and providing for mouse function when the computer rests on a table. An inside connector within the handle/controller 9. (FIG. 3). is accessible to the underside and provides connection to the base unit directly or to the connector chord.

In the embodiment shown the base unit has side legs 3. (FIGS. 1, 2, 3). This provides for resting and operating the computer on a table if one doesn't wish to remove the handle/controller. It may also provide for external storage in the legs of such items as added batteries or even a Global Positioning (GPS) unit driven by the external batteries. and suitably connected to the computer as to provide navigational capabilities.

Operation

When the computer is on and mouse compatible software is active the operation is simple.

1. set the left/right switch 8. (FIG. 3) according to which hand is to be used in the operation.
2. Grasp the handle/controller 4. (FIG. 3) and move the cursor or pointer by rolling the cursor ball 5L or 5R. (FIG. 3) with the thumb Use the opposing finger to perform the functions of a mouse switch.

The handle/controller operates the same way whether it is attached to the computer or whether it is detached with the computer on a table top.

Summary, Ramifications and Scope

The reader will probably appreciate the capability supplied by this invention in providing two hand operation of a handheld computer powerful enough to run general purpose software such as Microsoft Windows and applications based thereon. Use of such software in a handheld computer has very significant if not endless ramifications. For instance the user can search computer files in a phone booth or do most useful computer operations while he holds the phone in one hand! This can't be done with a notebook or even a palmtop—let alone a manual notepad!

In fact it might be said that this invention permits a person for the first time in history to process significant mounts of information with the use of one hand while standing isolated in an empty field!

I claim:

1. A handheld computer comprising:
   a computer section including a top and a bottom,
   a base section located on the bottom of said computer section, said base section for supporting said computer section;
   a separate display section secured to the top of said computer section;
   a handle located on the bottom of said base section, said handle fashioned to be operated by either hand of a user;
   a first and second controller means located on said handle to be used by a respective left or right hand of said user, said first and second controller means each including: a rotatable ball to be rotated by the thumb of a respective hand of said user, a pressure-activated action switch to be operated by a finger of said respective hand, and information generating means for generating first information regarding amount and direction of rotation of said ball, said information generating means is further able to generate second information regarding the position of said action switch;
   recording means for recording said first information and said second information;
   a conductor for connecting information generating means of said first and second controller means to said recording means to record said first information and said second information.

2. The handheld computer of claim 1 wherein said computer comprises in addition a first selection means consisting of a switch for selectively enabling said first controller means while simultaneously disabling said second controller means, and for selectively enabling said second controller means while simultaneously disabling said first controller means, said first selection means making said handle operable by either of said left hand or said right hand, but not both.

* * * * *